US010836065B2

(12) United States Patent
Garcia-Perez et al.

(10) Patent No.: US 10,836,065 B2
(45) Date of Patent: Nov. 17, 2020

(54) EXPOSED LOAD CELL IN A FOOD PROCESSING MACHINE

(71) Applicant: Provisur Technologies, Inc., Chicago, IL (US)

(72) Inventors: Fernando Garcia-Perez, Park Ridge, IL (US); Ryan M. Torrenga, Bourbonnais, IL (US); Gage A. Fox, Manhattan, IL (US); Ryan J. O'Connor, Bolingbrook, IL (US); Glen F. Pryor, Manhattan, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 135 days.

(21) Appl. No.: 15/398,668

(22) Filed: Jan. 4, 2017

(65) Prior Publication Data

US 2018/0186025 A1 Jul. 5, 2018

(51) Int. Cl.

*B26D 7/30* (2006.01)
*B26D 7/32* (2006.01)
*G01G 11/00* (2006.01)
*G01G 19/00* (2006.01)

(52) U.S. Cl.

CPC ................ *B26D 7/30* (2013.01); *B26D 7/32* (2013.01); *B26D 2210/00* (2013.01); *B26D 2210/02* (2013.01)

(58) Field of Classification Search

CPC ...... B62K 17/00; B26D 2210/02; B26D 7/30; B26D 7/32; G01G 11/00; G01G 19/00
See application file for complete search history.

(56) References Cited

U.S. PATENT DOCUMENTS

| | | | | |
|---|---|---|---|---|
| 3,200,864 A | | 8/1965 | Gillman | |
| 3,605,837 A | * | 9/1971 | Lambert | B26D 7/30 177/164 |
| 3,846,957 A | | 11/1974 | Divan | |

(Continued)

FOREIGN PATENT DOCUMENTS

| | | |
|---|---|---|
| DE | 8129776.9 | 12/1981 |
| EP | 0713753 A2 | 5/1996 |

(Continued)

OTHER PUBLICATIONS

Notification of Transmittal of the International Search Report and the Written Opinion of the International Searching Authority, or the Declaration, for PCT/US17/63335, dated Feb. 1, 2018, 9 pages.

(Continued)

*Primary Examiner* — Stephen Choi
(74) *Attorney, Agent, or Firm* — Klintworth & Rozenblat IP LLP

(57) ABSTRACT

A food processing machine includes a slicing device, a slicing conveyor, a classifier device, and an exposed load cell device. The slicing device is adapted to slice a food product. The slicing conveyor is adapted to move the food product sliced by the slicing device. The classifier device is adapted to classify the food product sliced by the slicing device. The exposed load cell device is adapted to weigh the food product sliced by the slicing device. The exposed load cell device is located between the slicing conveyor and the classifier device. The exposed load cell device is permanently exposed providing accessible cleaning.

20 Claims, 7 Drawing Sheets

(56) References Cited

U.S. PATENT DOCUMENTS

| | | | | |
|---|---|---|---|---|
| 3,848,491 | A | 11/1974 | Flesch | |
| 4,136,504 | A | 1/1979 | Wyslotsky | |
| 4,356,205 | A | 10/1982 | Richards | |
| 4,428,263 | A | 1/1984 | Lindee et al. | |
| 4,712,458 | A | 12/1987 | Mally | |
| 4,745,681 | A | 5/1988 | Hollis, Jr. et al. | |
| 4,763,738 | A | 8/1988 | Kuchler | |
| 5,042,340 | A * | 8/1991 | Kasper | B26D 5/20 83/367 |
| 5,065,656 | A | 11/1991 | Flisram | |
| 5,117,717 | A | 6/1992 | Mally | |
| 5,129,298 | A | 7/1992 | Cresson et al. | |
| 5,164,777 | A | 11/1992 | Agarwal | |
| 5,267,168 | A | 11/1993 | Antonissen et al. | |
| 5,271,340 | A | 12/1993 | Whitney | |
| 5,481,466 | A | 1/1996 | Carey | |
| 5,499,719 | A | 3/1996 | Lindee | |
| 5,564,554 | A | 10/1996 | Lawrence | |
| 5,628,237 | A | 5/1997 | Lindee et al. | |
| 5,666,866 | A * | 9/1997 | Huang | B26D 7/30 177/243 |
| 5,668,634 | A | 9/1997 | Newman | |
| 5,704,265 | A * | 1/1998 | Johnson | B26D 1/0006 83/110 |
| 5,724,874 | A | 3/1998 | Lindee et al. | |
| 5,787,776 | A | 8/1998 | Nishimoto | |
| 5,787,801 | A | 8/1998 | Kirk et al. | |
| 5,875,697 | A | 3/1999 | Cole et al. | |
| 5,974,925 | A | 11/1999 | Lindee et al. | |
| 5,988,033 | A | 11/1999 | Skaar et al. | |
| 6,164,174 | A | 12/2000 | Sigurdsson et al. | |
| 6,320,141 | B1 | 11/2001 | Lindee | |
| 6,484,615 | B2 | 11/2002 | Lindee | |
| 6,585,580 | B1 | 7/2003 | Hergott | |
| 6,591,723 | B1 | 7/2003 | Jung | |
| 6,763,750 | B2 | 7/2004 | Lindee | |
| 6,883,409 | B1 | 4/2005 | Spix et al. | |
| 7,073,419 | B2 | 7/2006 | Weber | |
| 7,089,840 | B2 | 8/2006 | Freudinger et al. | |
| 7,270,039 | B2 | 9/2007 | Lindee | |
| 7,278,344 | B2 | 10/2007 | Pryor | |
| 7,299,728 | B2 | 11/2007 | Ferrin et al. | |
| 7,306,444 | B2 | 12/2007 | Heinzen et al. | |
| 7,377,201 | B2 | 5/2008 | Chen | |
| 7,600,459 | B2 | 10/2009 | Bodey et al. | |
| 7,603,936 | B2 | 10/2009 | Pryor et al. | |
| 8,091,458 | B2 | 1/2012 | Culling | |
| 8,109,186 | B2 | 2/2012 | Culling | |
| 8,250,955 | B2 | 8/2012 | Sandberg et al. | |
| 8,336,434 | B2 | 12/2012 | Sandberg et al. | |
| 8,408,108 | B2 | 4/2013 | Redemann et al. | |
| 8,408,109 | B2 | 4/2013 | Lindee et al. | |
| 8,473,094 | B2 | 6/2013 | Becker et al. | |
| 8,596,175 | B2 | 12/2013 | Weber | |
| 8,616,099 | B2 | 12/2013 | Hallvardsson et al. | |
| 8,777,284 | B2 | 7/2014 | Schaller et al. | |
| 8,812,146 | B2 | 8/2014 | Einarsson et al. | |
| 8,850,938 | B2 | 10/2014 | Lindee et al. | |
| 8,869,664 | B2 | 10/2014 | Eyles et al. | |
| 8,978,529 | B2 | 3/2015 | Pasek | |
| 9,062,689 | B2 | 6/2015 | Schaaf | |
| 9,095,144 | B1 | 8/2015 | Sekerak et al. | |
| 9,173,431 | B2 | 11/2015 | Kodali | |
| 9,272,428 | B2 | 3/2016 | Müller et al. | |
| 9,296,120 | B2 | 3/2016 | McLaughlin et al. | |
| 9,375,859 | B2 | 6/2016 | Weber | |
| 9,381,660 | B2 | 7/2016 | Schaub | |
| 9,399,531 | B2 | 7/2016 | Pryor et al. | |
| 9,457,487 | B2 | 10/2016 | Mayer | |
| 2002/0098791 | A1 | 7/2002 | Handel et al. | |
| 2004/0035276 | A1 | 2/2004 | Weber | |
| 2005/0132864 | A1 | 6/2005 | Biggs et al. | |
| 2006/0219069 | A1 | 10/2006 | Skaar et al. | |
| 2008/0000337 | A1 | 1/2008 | Dickover et al. | |
| 2008/0016999 | A1 | 1/2008 | Mathues et al. | |
| 2008/0196566 | A1 | 8/2008 | Culling | |
| 2008/0196603 | A1 | 8/2008 | Culling | |
| 2009/0120256 | A1 * | 5/2009 | Pasek | B26D 7/18 83/446 |
| 2009/0188357 | A1 | 7/2009 | Lindee et al. | |
| 2010/0288093 | A1 | 11/2010 | Seager et al. | |
| 2010/0307303 | A1 | 12/2010 | Weber | |
| 2010/0307304 | A1 | 12/2010 | Weber | |
| 2011/0126680 | A1 | 6/2011 | Weber | |
| 2011/0247466 | A1 | 10/2011 | Weber | |
| 2011/0265621 | A1 | 11/2011 | Schmidt | |
| 2011/0265624 | A1 | 11/2011 | Pasek et al. | |
| 2012/0060659 | A1 | 3/2012 | Weber | |
| 2012/0073415 | A1 | 3/2012 | Maidel et al. | |
| 2012/0085216 | A1 | 4/2012 | Lobbia et al. | |
| 2012/0086226 | A1 | 4/2012 | Weber | |
| 2012/0212603 | A1 | 8/2012 | Lindee et al. | |
| 2012/0312135 | A1 | 12/2012 | Schaub | |
| 2013/0019722 | A1 | 1/2013 | Eyles et al. | |
| 2013/0104709 | A1 | 5/2013 | Rother | |
| 2013/0108409 | A1 | 5/2013 | Wu et al. | |
| 2013/0139665 | A1 | 6/2013 | Sperry et al. | |
| 2014/0144303 | A1 | 5/2014 | Muller | |
| 2014/0208917 | A1 | 7/2014 | Whitney | |
| 2014/0262669 | A1 | 9/2014 | Conti et al. | |
| 2014/0338509 | A1 | 11/2014 | Lindee et al. | |
| 2014/0352505 | A1 | 12/2014 | Grasselli | |
| 2015/0013516 | A1 | 1/2015 | Bifulco | |
| 2015/0122095 | A1 | 5/2015 | Schmeiser | |
| 2015/0135921 | A1 | 5/2015 | Martinez-Montes | |
| 2015/0202786 | A1 | 7/2015 | Mayer et al. | |
| 2016/0144527 | A1 | 5/2016 | Achenbach et al. | |
| 2016/0271822 | A1 | 9/2016 | Burk et al. | |

FOREIGN PATENT DOCUMENTS

| | | |
|---|---|---|
| EP | 0933690 A2 | 8/1999 |
| GB | 2239787 B | 7/1991 |
| GB | 2276950 B | 4/1996 |

OTHER PUBLICATIONS

Curriculum Vitae of Richard Hooper, Ph.D., P.E., Jan. 2019.

C.A. Moore, Automation in the Food Industry, Springer (1991).

Petition for Inter Partes Review of U.S. Pat. No. 6,320,141, Case IPR2019-01467, dated Aug. 9, 2019, 94 pages.

* cited by examiner

EXPOSED LOAD CELL IN A FOOD PROCESSING MACHINE

FIELD OF THE DISCLOSURE

This disclosure relates to the use of exposed load cells integrated into food processing machines.

BACKGROUND

Food processing machines are used to process food in order to slice and package food products. Some food processing machines do not weigh the sliced food products directly, and instead utilize off-line weighing devices to ensure that the sliced food products are acceptable. This produces inefficiencies and is timely and costly. Other food processing machines utilize load cells which are protected in a housing to weigh the food products. These load cells are inefficient to clean, as the load cells have to be removed from their protective housing prior to cleaning, which is timely and costly. Still other food processing machines do not weigh the sliced food products until the sliced food products have advanced into the packaging device of the food processing machine. This produces additional inefficiencies and is timely and costly.

A food processing machine, and method of its use, is needed to overcome one or more of the issues associated with one or more of the existing food processing machines.

SUMMARY

In one embodiment, a food processing machine includes a slicing device, a slicing conveyor, a classifier device, and an exposed load cell device. The slicing device is adapted to slice a food product. The slicing conveyor is adapted to move the food product sliced by the slicing device. The classifier device is adapted to classify the food product sliced by the slicing device. The exposed load cell device is adapted to weigh the food product sliced by the slicing device. The exposed load cell device is located between the slicing conveyor and the classifier device. The exposed load cell device is permanently exposed providing accessible cleaning.

In one embodiment, a food processing machine includes a slicing device, a slicing conveyor, a classifier device, and an exposed load cell device. The slicing device is adapted to slice a food product. The slicing conveyor is adapted to move the food product sliced by the slicing device. The classifier device is adapted to classify the food product sliced by the slicing device. The exposed load cell device is adapted to weigh the food product sliced by the slicing device. The exposed load cell device comprises an exposed load cell conveyor, an exposed load cell, and a base. The exposed load cell conveyor is located between the slicing conveyor and the classifier device. The exposed load cell device is permanently exposed providing accessible cleaning.

In another embodiment, a method of operating a food processing machine is disclosed. In one step, a food product is sliced with a slicing device. In another step, the food product sliced by the slicing device is moved from the slicing device towards an exposed load cell device with a slicing conveyor. In an additional step, the food product sliced by the slicing device is weighed with the exposed load cell device, wherein the exposed load cell device is permanently exposed providing accessible cleaning. In another step, the food product sliced by the slicing device is moved from the exposed load cell device to a classifier device using the exposed load cell device, wherein the exposed load cell device is located between the slicing conveyor and the classifier device. In still another step, the food product sliced by the slicing device is classified with the classifier device.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
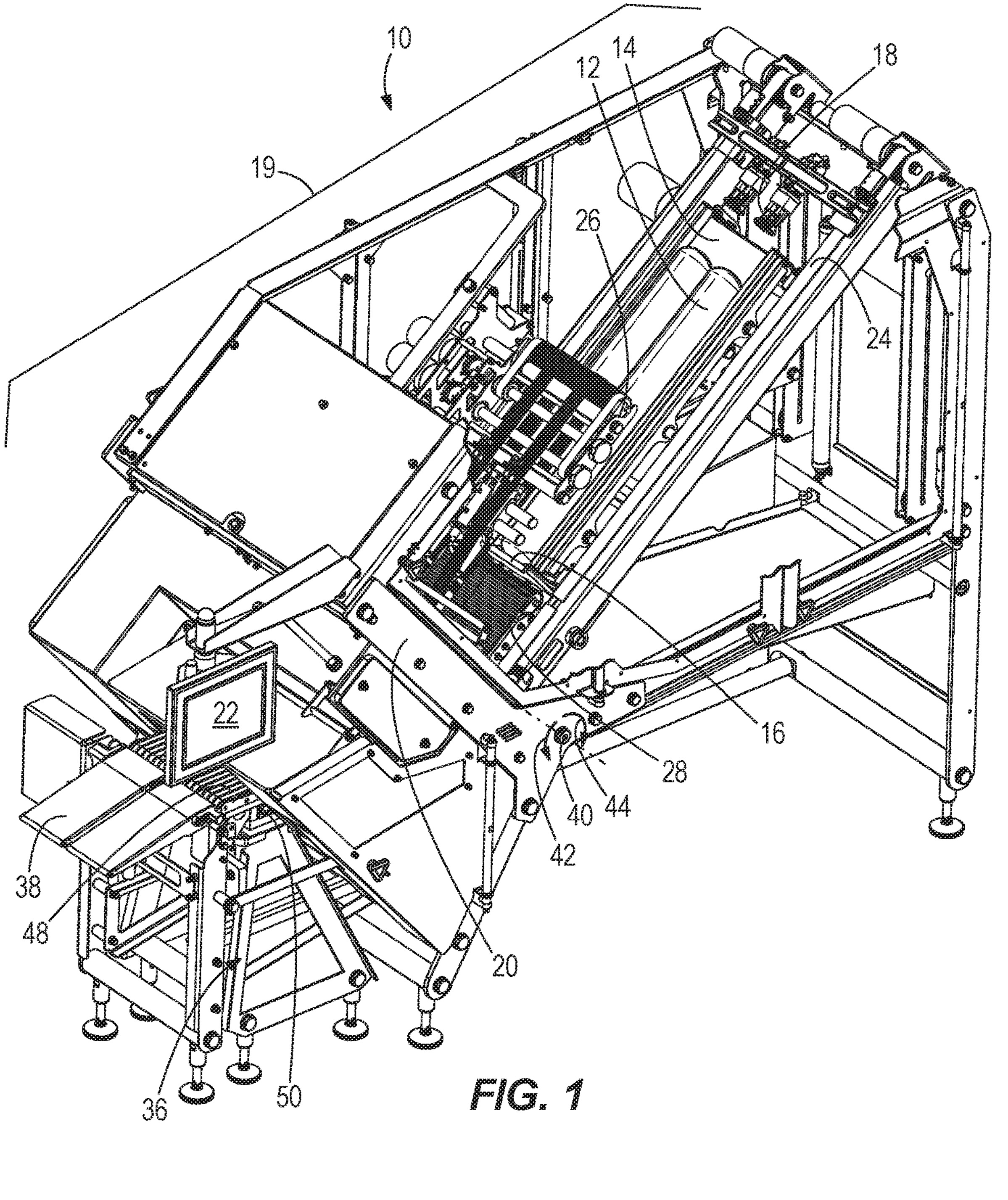
FIG. 1 illustrates a side perspective view of one embodiment of a food processing machine with a food product disposed in a product tray in a raised position, held in place by a gate, with a gripper device disposed apart from the food product.
Figure 2:
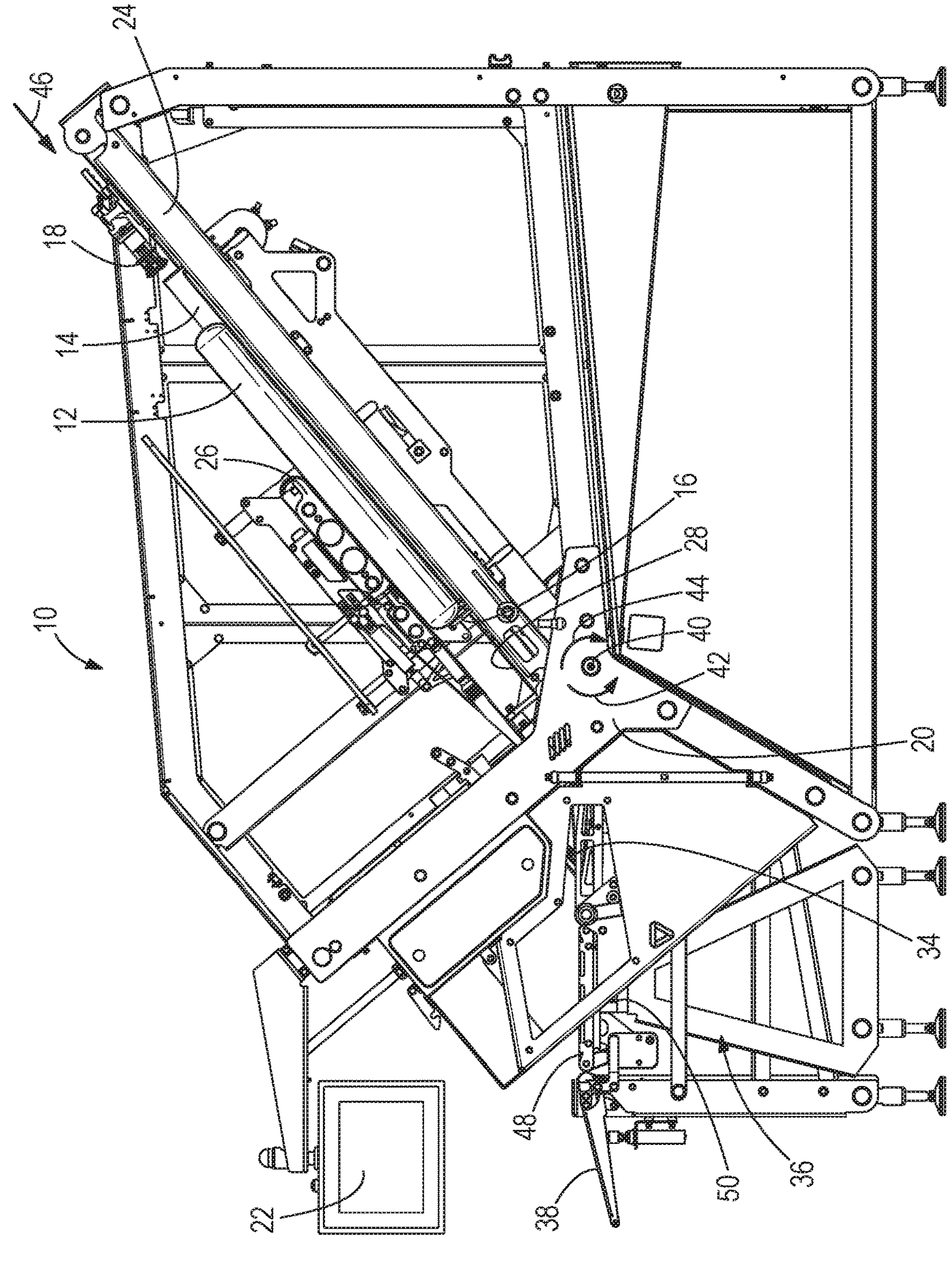
FIG. 2 illustrates a side view of the food processing machine of the embodiment of FIG. 1 with the food product disposed in the product tray in the raised position, held in place by the gate, with the gripper device disposed apart from the food product.
Figure 3:
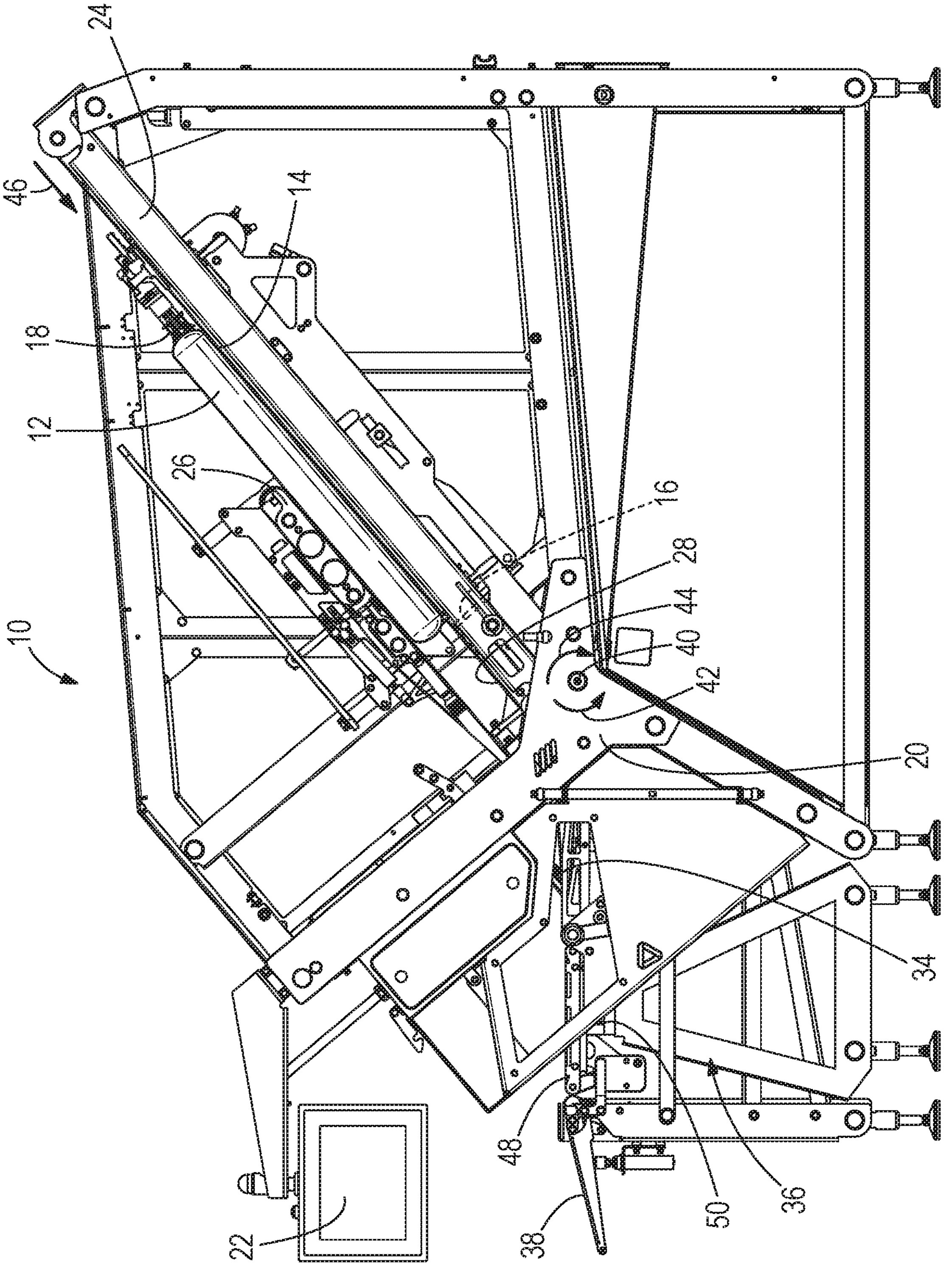
FIG. 3 illustrates a side view of the food processing machine of the embodiment of FIG. 1 with the food product disposed in the product tray in the raised position, with the gate having been lowered away from the food product, with the gripper device disposed against an end of the food product holding the food product in place.
Figure 4:
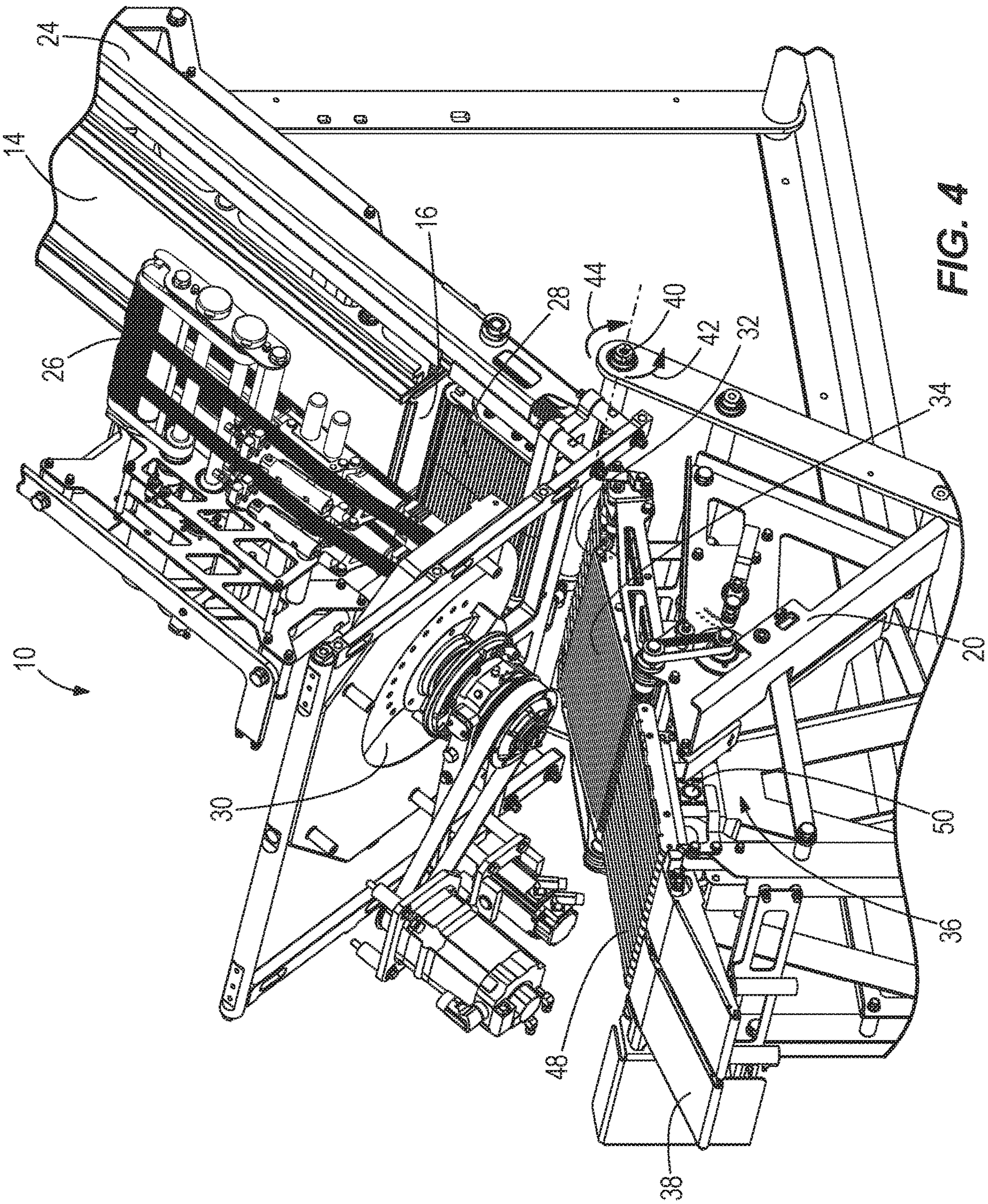
FIG. 4 illustrates a partial side perspective view of the food processing machine of the embodiment of FIG. 1 with a portion of a frame of the food processing machine of FIG. 1 removed and the food product removed to assist in viewing internal components.
Figure 5:
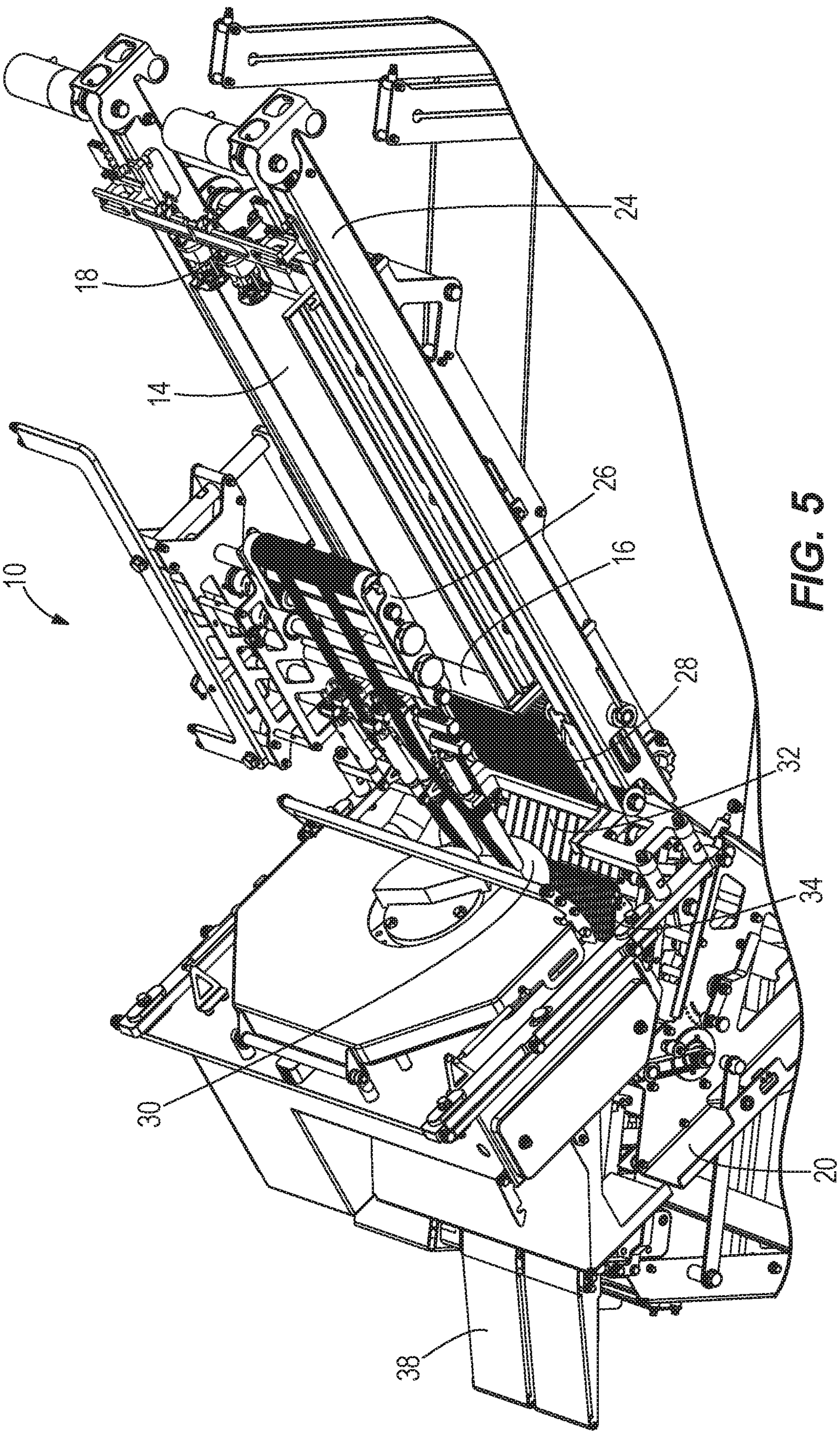
FIG. 5 illustrates a top partial perspective view of the food processing machine of the embodiment of FIG. 1 with the portion of the frame of the food processing machine of FIG. 1 removed and the food product removed to assist in viewing internal components.

FIG. 1 illustrates a side perspective view of one embodiment of a food processing machine 10 with a food product 12 disposed in a product tray 14 in a raised position, held in place by a gate 16, with a gripper device 18 disposed apart from the food product 12. FIG. 2 illustrates a side view of the food processing machine 10 of the embodiment of FIG. 1 with the food product 12 disposed in the product tray 14 in the raised position, held in place by the gate 16, with the gripper device 18 disposed apart from the food product 12. FIG. 3 illustrates a side view of the food processing machine 10 of the embodiment of FIG. 1 with the food product 12 disposed in the product tray 14 in the raised position, with the gate 16 having been lowered away from the food product 12, with the gripper device 18 disposed against an end of the food product 12 holding the food product 12 in place. FIG. 4 illustrates a partial side perspective view of the food processing machine 10 of the embodiment of FIG. 1 with a portion 19 of a frame 20 of the food processing machine 10 of FIG. 1 removed and the food product 12 removed to assist in viewing internal components. FIG. 5 illustrates a top partial perspective view of the food processing machine 10 of the embodiment of FIG. 1 with the portion 19 of the frame 20 of the food processing machine 10 of FIG. 1 removed and the food product 12 removed to assist in viewing internal components.

As shown collectively in FIGS. 1-5, the food processing machine 10 comprises the product tray 14, the gate 16, the gripper device 18, the frame 20, a control system 22, a product tray lift 24, an upper infeed 26, a lower infeed 28, a slicing device 30, a slicing conveyor 32, a transfer conveyor 34, an exposed load cell device 36, and a classifier device 38.

The control system 22, comprising at least one processor, is adapted to control the entire food processing machine 10 including all of its components identified herein. As such, all movements or actions of any components of the food processing machine 10 described herein are controlled by the control system 22. The product tray lift 24 is adapted to rotate around pivot point 40 in counter-clockwise and clockwise directions 42 and 44 in order to respectfully raise and lower the product tray 14. Initially, the food product 12 is loaded in the product tray 14 while the product tray lift 24 has the product tray 14 disposed in a horizontal position (not shown) with the gate 16 holding the food product 12 in the product tray 14. After the food product 12 is loaded in the product tray 14, the product tray lift 24 is rotated in counter-clockwise direction 42 to dispose the product tray 14, the gate 16, and the food product 12 held within the product tray 14 by the gate 16 in the position of FIG. 2. Next, the gripper device 18 is moved from its raised position apart from the food product 12 as shown in FIG. 2 in direction 46 to a lowered position against an end of the food product 12 as shown in FIG. 3 at which time the gripper device 18 is used to grip an end of the food product 12. Subsequently, the gate 16 is moved away from its position against the food product 12 as shown in FIG. 2 to its lowered position as shown in FIG. 3 so that the gate 16 no longer blocks the food product 12 from moving out of the product tray 14.

Next, the upper infeed 26 is rotated clockwise 44 and the lower infeed 28 is rotated counter-clockwise 42 while the gripper device 18 is moved further in direction 46 to gradually move the food product 12 into the slicing device 30. The slicing device 30 slices the food product 12 which then falls onto the slicing conveyor 32 which is located directly underneath the slicing device 30. The slicing conveyor 32 rotates counter-clockwise 42 to move the sliced food product 12 to and onto the transfer conveyor 34 which is disposed next to the slicing conveyor 32. The transfer conveyor 34 rotates counter-clockwise to move the sliced food product 12 to and onto an exposed load cell conveyor 48 of the exposed load cell device 36 which is next to the transfer conveyor 34. It is noted that the transfer conveyor 34 is located between the slicing conveyor 32 and the exposed load cell conveyor 48 of the exposed load cell device 36.

Figure 6:
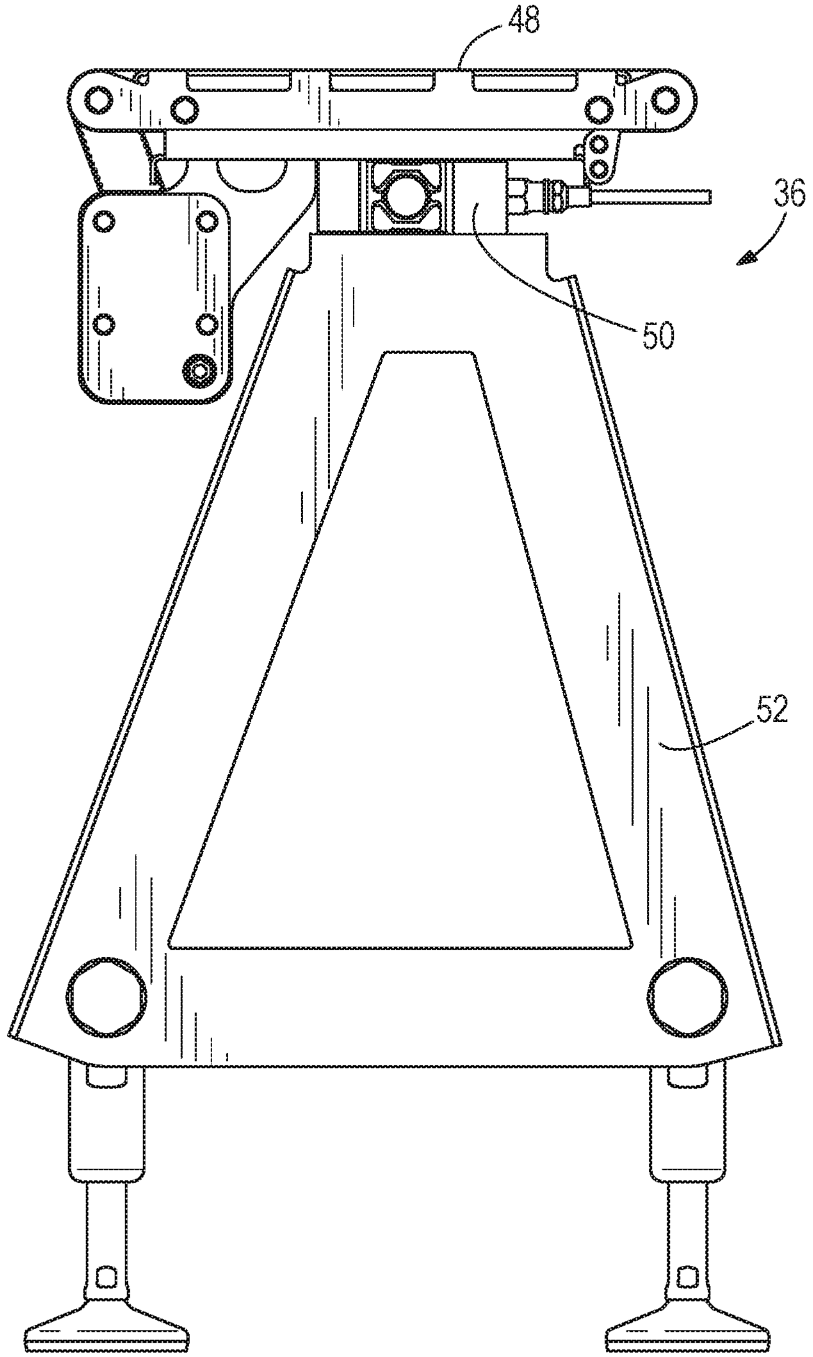
FIG. 6 illustrates a side view of the exposed load cell device of the food processing machine of the embodiment of FIGS. 1-5 separated from the food processing machine.

FIG. 6 illustrates a side view of the exposed load cell device 36 of the food processing machine 10 of the embodiment of FIGS. 1-5 separated from the food processing machine 10. The exposed load cell device 36, which is integrated into the food processing machine 10, including being integrated into the control system 22, comprises the exposed load cell conveyor 48, an exposed load cell 50, and a base 52. The exposed load cell 50 is attached to a top of the base 52. As shown collectively in FIGS. 1-5, the base 52 of the exposed load cell device 36 is fixedly attached to the frame 20 of the food processing machine 10. As shown in FIG. 6, the exposed load cell conveyor 48 is attached to a top of the exposed load cell 50.

As illustrated in FIGS. 1-5 collectively, the exposed load cell 50 of the exposed load cell device 36 weighs the sliced food product 12, and then the exposed load cell conveyor 48 of the exposed load cell device 36 moves the weighed and sliced food product 12 to and onto a classifier device 38 which is disposed next to the exposed load cell device 36. The exposed load cell 50 of the exposed load cell device 36 is permanently exposed (i.e. not contained within a protective housing) providing accessible cleaning so that the exposed load cell 50 can be easily washed with a liquid, such as by spraying the exposed load cell 50 with a nozzle, in order to clean the exposed load cell 50 without having to remove the exposed load cell 50 from a protective housing. This provides ease of access to the exposed load cell 50 which reduces the time and cost of cleaning and maintenance.

It is noted that the exposed load cell conveyor 48 of the exposed load cell device 36 is located between the slicing conveyor 32 and the classifier device 38, and more particularly the exposed load cell conveyor 48 of the exposed load cell device 36 is located between the transfer conveyor 34 and the classifier device 38. The classifier device 38 classifies the weighed and sliced food product 12 by determining whether the weighed and sliced food product 12 meets an acceptable criteria in part based on the determined weight of the weighed and sliced food product 12, as determined by the exposed load cell device 36. The weighed and sliced food product 12 which is determined by the classifier device 38 to meet the acceptable criteria is then packaged. The weighed and sliced food product 12 which is determined by the classifier device to not meet the acceptable criteria can then be discarded or used for other purposes.

Figure 7:
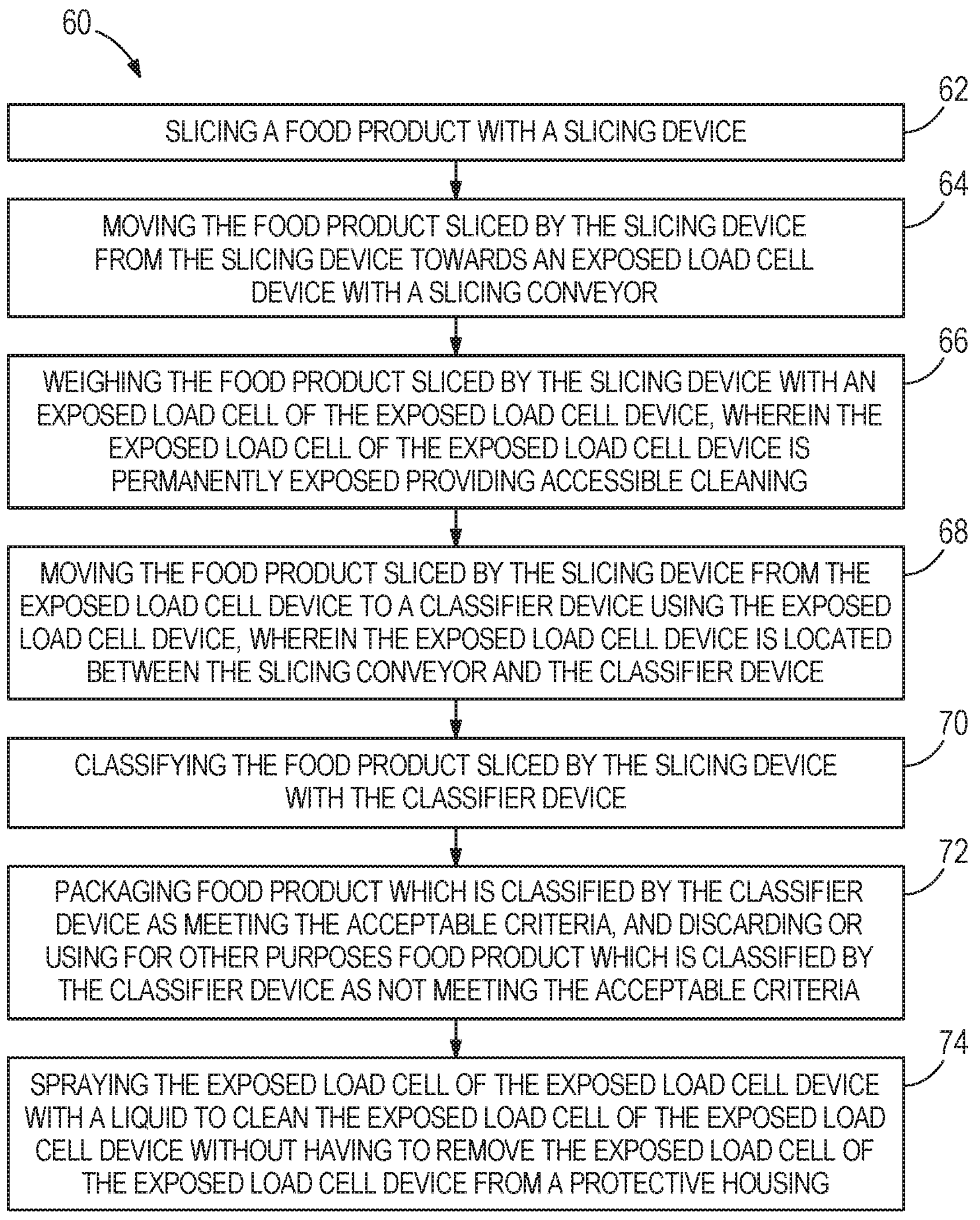
FIG. 7 illustrates a flow chart of one embodiment of a method of operating a food processing machine.

FIG. 7 illustrates a flow chart of one embodiment of a method 60 of operating a food processing machine. The method 60 of FIG. 7 may use any of the embodiments of the food processing machine 10 of FIGS. 1-6. In other embodiments, the method 60 of FIG. 7 may use varying food processing machines. In step 62, a food product is sliced with a slicing device. In one embodiment, step 62 comprises the food product sliced by the slicing device falling from the slicing device onto a slicing conveyor located directly underneath the slicing device. In step 64, the food product sliced by the slicing device is moved from the slicing device towards an exposed load cell device with a slicing conveyor. In one embodiment, step 64 comprises moving the food product sliced by the slicing device from the slicing conveyor, to a transfer conveyor, to an exposed load cell conveyor of the exposed load cell device. In another embodiment, step 64 comprises moving the food product sliced by the slicing device directly from the slicing conveyor to an exposed load cell conveyor of the exposed load cell device.

In step 66, the food product sliced by the slicing device is weighed with an exposed load cell of the exposed load cell device, wherein the exposed load cell of the exposed load cell device is permanently exposed providing accessible cleaning. In step 68, the food product sliced by the slicing device is moved from the exposed load cell device to a classifier device using the exposed load cell device, wherein the exposed load cell device is located between the slicing conveyor and the classifier device. In one embodiment, step 68 comprises moving the food product sliced by the slicing device with an exposed load cell conveyor of the exposed load cell device. In step 70, the food product sliced by the slicing device is classified with the classifier device. In one embodiment, step 70 comprises determining whether the food product meets an acceptable criteria in part based on a weight of the food product determined by the exposed load cell device.

In step 72, food product which is classified by the classifier device as meeting the acceptable criteria is packaged, and food product which is classified as not meeting the acceptable criteria is discarded of or used for other purposes. In step 74, an exposed load cell of the exposed load cell device is sprayed with a liquid to clean the exposed load cell of the exposed load cell device without having to remove the exposed load cell of the exposed load cell device from a protective housing. In another embodiment, step 74 comprises cleaning the exposed load cell of the exposed load cell device with any cleaning medium without having to remove the exposed load cell of the exposed load cell device from a protective housing. In other embodiments, any steps of the method 60 may be modified in substance or in order, any steps of the method 60 may not be followed, or one or more additional steps may be added to the method 60.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A food processing machine comprising:

a slicing device adapted to slice a food product;

a slicing conveyor adapted to move the food product sliced by the slicing device;

a classifier device adapted to classify the food product sliced by the slicing device; and an exposed load cell device comprising an exposed load cell, the exposed load cell comprising a top surface disposed in a parallel alignment within an imaginary top surface plane, a bottom surface disposed in a parallel alignment within an imaginary bottom surface plane, and a side surface extending between the top surface and the bottom surface, the exposed load cell adapted to weigh the food product sliced by the slicing device, wherein the exposed load cell device is located between the slicing conveyor and the classifier device, and no protective housing extending between the imaginary top surface plane and the imaginary bottom surface plane.

2. The food processing machine of claim 1 further comprising a transfer conveyor, located between the slicing conveyor and the exposed load cell device, adapted to move the food product sliced by the slicing device from the slicing conveyor, to the transfer conveyor, to the exposed load cell device.

3. The food processing machine of claim 1 wherein the slicing conveyor is located directly underneath the slicing device.

4. The food processing machine of claim 1 wherein the exposed load cell device comprises an exposed load cell conveyor adapted to move the food product sliced by the slicing device from the exposed load cell conveyor to the classifier device.

5. The food processing machine of claim 4 further comprising a transfer conveyor, located between the slicing conveyor and the exposed load cell conveyor, adapted to move the food product sliced by the slicing device from the slicing conveyor, to the transfer conveyor, to the exposed load cell conveyor.

6. A food processing machine comprising:

a slicing device adapted to slice a food product;

a slicing conveyor adapted to move the food product sliced by the slicing device;

a classifier device adapted to classify the food product sliced by the slicing device; and an exposed load cell device comprising an exposed load cell conveyor, an exposed load cell, and a base, the exposed load cell comprising a top surface adjacent the exposed load cell conveyor, the top surface disposed in a parallel alignment within an imaginary top surface plane, a bottom surface adjacent the base, the bottom surface disposed in a parallel alignment within an imaginary bottom surface plane, and a side surface extending between the top surface and the bottom surface, the exposed load cell conveyor located between the slicing conveyor and the classifier device, the exposed load cell adapted to weigh the food product sliced by the slicing device, wherein no protective housing extends between the imaginary top surface plane and the imaginary bottom surface plane.

7. The food processing machine of claim 6 wherein the exposed load cell is attached to a top of the base, and the exposed load cell conveyor is attached to a top of the exposed load cell.

8. The food processing machine of claim 7 further comprising a frame, wherein the base is fixedly attached to the frame.

9. The food processing machine of claim 6 wherein the exposed load cell conveyor is adapted to move the food product sliced by the slicing device from the exposed load cell conveyor to the classifier device.

10. The food processing machine of claim 6 further comprising a transfer conveyor, located between the slicing conveyor and the exposed load cell conveyor, adapted to move the food product sliced by the slicing device from the slicing conveyor, to the transfer conveyor, to the exposed load cell conveyor.

11. The food processing machine of claim 10 wherein the exposed load cell conveyor is adapted to move the food product sliced by the slicing device from the exposed load cell conveyor to the classifier device.

12. The food processing machine of claim 6 wherein the slicing conveyor is located directly underneath the slicing device.

13. The food processing machine of claim 6 wherein the exposed load cell conveyor is adapted to move the food product sliced by the slicing device from the exposed load cell conveyor to the classifier device.

14. A method of operating a food processing machine comprising:

slicing a food product with a slicing device;

moving the food product sliced by the slicing device from the slicing device towards an exposed load cell device with a slicing conveyor;

weighing the food product sliced by the slicing device with an exposed load cell of the exposed load cell device, the exposed load cell comprising a top surface disposed in a parallel alignment within an imaginary top surface plane, a bottom surface disposed in a parallel alignment within an imaginary bottom surface plane, and a side surface extending between the top surface and the bottom surface, wherein no protective housing extends between the imaginary top surface plane and the imaginary bottom surface plane;

moving the food product sliced by the slicing device from the exposed load cell device to a classifier device using the exposed load cell device, wherein the exposed load cell device is located between the slicing conveyor and the classifier device; and classifying the food product sliced by the slicing device with the classifier device.

15. The method of claim 14 wherein the classifying the food product sliced by the slicing device with the classifier device comprises determining whether the food product meets an acceptable criteria in part based on a weight of the food product determined by the exposed load cell.

16. The method of claim 14 further comprising spraying the exposed load cell with a liquid to clean the exposed load cell.

17. The method of claim 14 further comprising moving the food product sliced by the slicing device from the slicing conveyor, to a transfer conveyor, to the exposed load cell device.

18. The method of claim 14 further comprising the food product sliced by the slicing device falling from the slicing device onto the slicing conveyor located directly underneath the slicing device.

19. The method of claim 14 wherein the moving the food product sliced by the slicing device from the exposed load cell device to the classifier device comprises moving the food product sliced by the slicing device with an exposed load cell conveyor of the exposed load cell device.

20. The method of claim 19 further comprising moving the food product sliced by the slicing device from the slicing conveyor, to a transfer conveyor, to the exposed load cell conveyor.

* * * * *